(12) United States Patent
Haila

(10) Patent No.: US 9,348,854 B1
(45) Date of Patent: *May 24, 2016

(54) SYSTEMS AND METHODS FOR AUTOMATED TAXONOMY MIGRATION IN AN XBRL DOCUMENT

(71) Applicant: WORKIVA INC., Ames, IA (US)

(72) Inventor: David Andrew Haila, Clive, IA (US)

(73) Assignee: Workiva Inc., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/469,286

(22) Filed: Aug. 26, 2014

Related U.S. Application Data

(63) Continuation of application No. 13/834,846, filed on Mar. 15, 2013, now Pat. No. 8,825,614.

(60) Provisional application No. 61/639,457, filed on Apr. 27, 2012.

(51) Int. Cl.
*G06F 17/30* (2006.01)

(52) U.S. Cl.
CPC .... *G06F 17/30309* (2013.01); *G06F 17/30908* (2013.01); *G06F 17/30923* (2013.01)

(58) Field of Classification Search
None
See application file for complete search history.

(56) References Cited

U.S. PATENT DOCUMENTS

| | | | |
|---|---|---|---|
| 7,415,482 B2 | 8/2008 | Blake et al. | |
| 7,472,346 B2 | 12/2008 | Baelen | |
| 7,822,769 B2 | 10/2010 | Rohan et al. | |
| 8,099,370 B2 | 1/2012 | Ohata | |
| 8,176,003 B2 | 5/2012 | Bush et al. | |
| 2005/0144166 A1 | 6/2005 | Chapus et al. | |
| 2006/0184539 A1 | 8/2006 | Blake et al. | |
| 2006/0242181 A1 | 10/2006 | Mueller-Klingspor | |
| 2006/0242624 A1 | 10/2006 | Mueller-Klingspor | |
| 2007/0078877 A1 | 4/2007 | Ungar et al. | |
| 2008/0201157 A1 | 8/2008 | McNamar | |
| 2008/0201172 A1 | 8/2008 | McNamar | |
| 2008/0201319 A1 | 8/2008 | McNamar | |
| 2008/0270312 A1 | 10/2008 | Ohata | |
| 2009/0019358 A1 | 1/2009 | Blake et al. | |
| 2009/0030754 A1 | 1/2009 | McNamar | |
| 2010/0122154 A1 | 5/2010 | Howell et al. | |
| 2011/0137923 A1 | 6/2011 | Koroteyev et al. | |

(Continued)

OTHER PUBLICATIONS

Financial Accounting Standards Board, 2011 FASB US GAAP Financial Reporting Taxonomy Release Notes, Jan. 31, 2011, 291 pages, copyright XBRL US, Inc. 2007-2010; Financial Accounting Foundation, Inc. 2010-2011.

(Continued)

*Primary Examiner* — Hung Q Pham

(74) *Attorney, Agent, or Firm* — Drinker Biddle & Reath LLP

(57) ABSTRACT

An XBRL taxonomy migration system includes: a processor having a memory on which a program executable by the processor is stored for performing a method of XBRL taxonomy migration; an XBRL taxonomy module including a first version of an XBRL taxonomy having XBRL concepts and a second version of the XBRL taxonomy having related XBRL concepts; and an automated taxonomy migration module that facilitates migrating XBRL concepts of an XBRL document having XBRL tags by replacing XBRL concepts of the first version of the XBRL taxonomy with XBRL concepts of the second version of the XBRL taxonomy.

26 Claims, 11 Drawing Sheets

(56) References Cited

U.S. PATENT DOCUMENTS

| | | |
|---|---|---|
| 2011/0258167 A1 | 10/2011 | Binstock et al. |
| 2011/0276873 A1 | 11/2011 | Gorur et al. |
| 2012/0011118 A1 | 1/2012 | Gleicher et al. |
| 2012/0278694 A1* | 11/2012 | Washio .............. G06F 17/2288 715/205 |

OTHER PUBLICATIONS

Hoffman et al., Extensible Business Reporting Language (XBRL) 2.1, Recommendation—Dec. 31, 2003 + Corrected Errata—Apr. 25, 2005, pp. 1-158, editors Engel et al., copyright 2000-2004, 2005 XBRL International.

* cited by examiner

XBRL Concept Search　　　　　　　　　　　　　　　　　　　　　□ ✕

🔍 Search Taxonomy　　　　　　　　　　　　　　　　　　　　　　　　New Concept Search

Type [Concept ▼]　Period Type [-ALL- ▼]　Data Type [-ALL- ▼]　☐ My Extensions　　　[　　　　] [Search] ☑ Advanced ⟋ 405

☑ New Concepts　☐ Incl Deprecated　☐ Taxonomy Tree Filter 🔖　☐ Branch Filter on 🔖

⊙ Search ○ Outline Tree ○ Taxonomy Tree [EDIT]　20 results found　　Create New Concept ✎⊕

Accounts payable, Current ☆ — 420　　　　　　　　　　　　　　　　　　　　○○○ 72%　　⟋ 410
⊙ Monetary [NEW] — 415
Carrying value as of the balance sheet date of liabilities incurred (and for which invoices have typically been received) and payable to vendors for goods and services received that are used in an entity's business. Used to reflect the current portion of the liabilities (due within one year or...

Accrued Liabilities, Current ☆　　　　　　　　　　　　　　　　　　　　　　○○○ 46%
⊙ Monetary [NEW] — 415
Carrying value as of the balance sheet date of obligations incurred and payable, pertaining to costs that are statutory in nature, are incurred on contractual obligations, or accumulate over time and for which invoices have not yet been received or will not be rendered. Examples include ...

Stockholders' Equity Including Portion Attributable to Noncontrolling Interest ☆　　○○○ 34%
⊙ Monetary [NEW] — 415
Total of Stockholders' Equity (deficit) items, net of receivables from officers, directors owners, and affiliates of the entity including portions attributable to both the parent and noncontrolling interests (previously referred to as minority interest), if any. The entity including portions ...

Employee-related Liabilities, Current ☆　　　　　　　　　　　　　　　　　　○○

FIG. 4

Deprecated Concept Search

XBRL Concept Search — 500 / 520

[Cash] [×] [Search] ☑ Advanced — 505

Type [Concept ▾] Period Type [-ALL- ▾] Data Type [-ALL- ▾] ☐ My Extensions

☐ New Concepts ☑ Incl Deprecated ☐ Taxonomy Tree Filter ☐ Branch Filter on

● Search ○ Outline Tree ○ Taxonomy Tree [EDIT] 20 results found — Create New Concept — 530

---

510

Cash and Cash Equivalents, Period Increase (Decrease) ○○○ 89%
🖩 Monetary
Includes currency on hand as well as demand deposits with banks or financial institutions. It also includes other kinds of accounts that have the general characteristics of demand deposits in that the Entity may deposit additional funds at any time and also effectively may withdraw funds...
The net change between the beginning and ending balance of cash and cash equivalents.

Cash Dividends (Deprecated 2009-01-31) — 515
🖩 Monetary (DEPRECATED) ○○○ 1%
Cash dividend declared by an entity to shareholders during the period. This element includes paid and unpaid dividends declared during the period.

Cash and Due from Banks ○○○ 1%
◉ Monetary
For banks and other depository institutions: Includes cash on hand(currency and coin), cash items in process of collection, noninterest bearing deposits due from other financial institutions (including corporate credit unions), and balances with the Federal Reserve Banks, Federal Home …

SYSTEMS AND METHODS FOR AUTOMATED TAXONOMY MIGRATION IN AN XBRL DOCUMENT

CROSS-REFERENCE TO RELATED APPLICATIONS

This application is a continuation of U.S. patent application Ser. No. 13/834,846 filed on Mar. 15, 2013, which claims the priority benefit of U.S. Provisional Patent Application No. 61/639,457 entitled "Systems and Methods for Automated Taxonomy Migration in an XBRL Document" and filed on Apr. 27, 2012, both of which are hereby incorporated herein by reference in their entirety.

BACKGROUND

1. Field

Embodiments generally relate to reporting of business data in documents using the eXtensible Business Reporting Language (XBRL), and more particularly to systems and methods for automated taxonomy migration in an XBRL document.

2. Related Art

XBRL is a standardized computer language by which businesses may efficiently and accurately communicate business data with each other and with regulating agencies. [See Extensible Business Reporting Language (XBRL) 2.1, available at http://www.xbrl.org/Specification/XBRL-RECOMMENDATION-2003-12-31+Corrected-Errata-2005-04-25.rtf, and Recommendation 2003-12-31+Corrected Errata—2005-04-25 available at http://www.xbrl.org/Specification/XBRL-RECOMMENDATION-2003-12-31+Corrected-Errata-2005-04-25.htm.] It is a markup language not too dissimilar from XML (eXtensible Markup Language) and HTML (Hyper Text Markup Language). HTML was designed to display general-purpose data in a standardized way, XML was designed to transport and store general-purpose data in a standardized way, and XBRL was designed to transport and store business data in a standardized way.

A taxonomy is comprised of an XML Schema and all of the linkbases contained in that schema or directly referenced by that schema. The XML schema is known as a taxonomy schema. In XBRL terminology, a concept is a definition of a reporting term. Concepts manifest as XML Schema element definitions. In the taxonomy schema, a concept is given a concrete name and a type. The type defines the kind of data types allowed for facts measured according to the concept definition. For example, a "cash" concept would typically have a monetary type. This declares that when cash is reported, its value will be monetary. In contrast, an "accountingPoliciesNote" concept would typically have a string type so that, when the "accountingPoliciesNote" is reported in an XBRL instance, its value would be interpreted as a string of characters.

XBRL is bringing about a dramatic change in the way people think about exchanging business information. Financial disclosures are a prime example of an industry built around a paper based process that is being pushed into the technological age. This transition involves a paradigm shift from the pixel perfect world of building unstructured reports to a digital world where structured data is dominant.

One of the ongoing challenges faced by those preparing financial statements or other business reports with XBRL is managing change within the source taxonomy. In existing business reporting systems and methods using XBRL, migrating an XBRL representation of a business document from a current or older XBRL taxonomy to a new updated taxonomy is a laborious and error-prone task. Because of the complexities, the time and expense associated with migrating XBRL documents from one taxonomy to a new taxonomy has traditionally been very high, resulting in many XBRL documents continuing to be based upon deprecated taxonomies rather than being updated to the latest taxonomies.

SUMMARY

According to an embodiment, an XBRL taxonomy migration system includes: a processor having a memory on which a program executable by the processor is stored for performing a method of XBRL taxonomy migration; an XBRL taxonomy module including a first version of an XBRL taxonomy having XBRL concepts and a second version of the XBRL taxonomy having related XBRL concepts; and an automated taxonomy migration module that facilitates migrating XBRL concepts of an XBRL document having XBRL tags by replacing XBRL concepts of the first version of the XBRL taxonomy with XBRL concepts of the second version of the XBRL taxonomy.

The XBRL taxonomy migration system may further include a user interface module that identifies and facilitates migrating specific XBRL taxonomy concepts within an XBRL document from the first to the second version of the XBRL taxonomy.

The XBRL taxonomy migration system may further include an XBRL concept search module that searches for XBRL concepts matching search conditions within at least one of the XBRL document and the first and second versions of the XBRL taxonomy.

The XBRL taxonomy migration system may further include an automated matching XBRL concept replacement module that detects dependencies in calculations in the XBRL document using the migrating XBRL concepts. When dependencies are detected, the XBRL taxonomy migration system may determine whether a balance type of a first version XBRL taxonomy concept matches a balance type of a second version XBRL taxonomy concept replacing the first version XBRL taxonomy concept in the XBRL document. When the balance type of the first version XBRL taxonomy concept does not match the balance type of the second version XBRL taxonomy concept, the XBRL taxonomy migration system may adjust a weight of an arc using the XBRL taxonomy concept in a calculation assertion when replacing the first version XBRL taxonomy concept with the second version XBRL taxonomy concept in the XBRL document.

The XBRL taxonomy migration system may further include a business document editor module that facilitates tagging of business document entries with XBRL tags using the XBRL taxonomy module.

According to another embodiment, the method of performing XBRL taxonomy migration includes migrating XBRL concepts of an XBRL document having XBRL tags by replacing XBRL concepts of a first version of an XBRL taxonomy with XBRL concepts of a second version of the XBRL taxonomy.

The method may further include searching for XBRL concepts matching search conditions within at least one of the XBRL document and the first and second versions of the XBRL taxonomy.

The method may further include detecting dependencies in calculations in the XBRL document using the migrating XBRL concepts. When dependencies are detected, the method may include determining whether a balance type of a first version XBRL taxonomy concept matches a balance type of a second version XBRL taxonomy concept replacing the first version XBRL taxonomy concept in the XBRL document. When the balance type of the first version XBRL taxonomy concept does not match the balance type of the second version XBRL taxonomy concept, the method may further include adjusting a weight of an arc using the XBRL taxonomy concept in a calculation assertion when replacing the first version XBRL taxonomy concept with the second version XBRL taxonomy concept in the XBRL document.

BRIEF DESCRIPTION OF THE DRAWINGS

The above and other features and advantages of the invention will become more apparent by describing in detail exemplary embodiments thereof with reference to the attached drawings listed below.

FIG. 4 illustrates a window of a computer software user interface for new XBRL concept search, according to an embodiment.

FIG. 5 illustrates a window of a computer software user interface for deprecated XBRL concept search, according to an embodiment.

DETAILED DESCRIPTION

Figure 1:
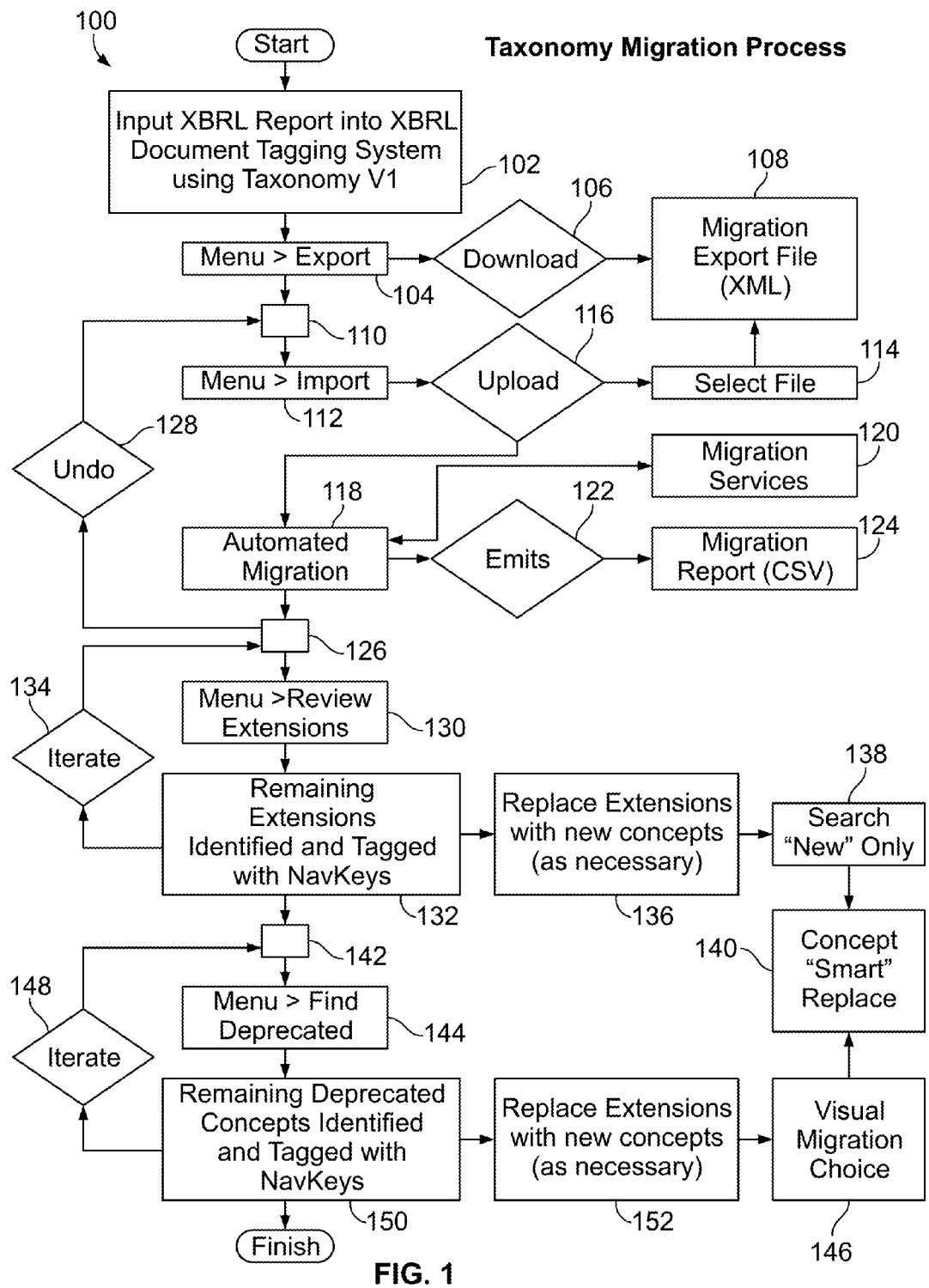
FIG. 1 illustrates a process for XBRL taxonomy migration, according to an embodiment.

Authoritative sources of reporting concepts for XBRL taxonomies change over time for several valid reasons. Keeping up with these changes is important for those who prepare business documents such as financial statements or other business reports according to the XBRL taxonomies, although it is a challenging task.

First and foremost, since XBRL taxonomies are models that mirror or implement more general standards, any evolution or change to an underlying standard can have a direct bearing on the XBRL taxonomy model that represents the standard. These changes can vary from the addition of new items to support fundamentally new regulation/practice or deprecation of an item. (When an XBRL item is deprecated, the item is identified as being obsolete, but is not deleted outright). However, the business standards are only half of the equation. Technical specification standards are also mirrored by the XBRL taxonomies, and while the technical specification standards are stable, they are not static. Second, as the XBRL model starts to be used in practice, certain modeling inconsistencies or invalid assumptions may break down, which may cause a structural reworking of XBRL taxonomies to improve ongoing clarity. Third, in an open environment (e.g., an environment that allows for XBRL extension taxonomies), standards bodies may choose to adopt a set of common practice extensions that are already in use by an industry segment to promote ongoing alignment of subsequent reports. Finally, but hopefully least common, is the correction of one or more model meta attributes due to error in the prior version of the XBRL taxonomy.

The problem of migrating from one XBRL taxonomy version to another one is not a new one to XBRL, and as a community, certain strides have been made to standardize a process for the identification of such changes between two versions of a taxonomy (e.g., XBRL Versioning Specification). This difference between two versions can serve as a set of highly technical release notes by identifying the moving parts. However, most software that exists today that understands the XBRL Versioning Specification can produce a difference file (e.g., change list) of two taxonomies and provide a list of changes, and possibly even a visual representation or blackline. While this sort of difference reporting is beneficial, this is far from being ideal. Given this starting point, a preparer of an XBRL document that is tasked with migrating from a current XBRL taxonomy to a new XBRL taxonomy still bears the burden of sifting through a change list that while correlated to the preparer's custom taxonomy, is disjoint from the preparer's customized taxonomy version. The preparer additionally bears the burden of applying those changes in the change list using a different piece of XBRL software (which may be a best case scenario) or utilizing a general text editor to perform an operation to find and replace XBRL text in the raw XBRL files themselves (which may be a worst case scenario).

Embodiments take a multifaceted approach to addressing this problem in a holistic/integrated fashion. By leveraging the structured data of the source taxonomy, embodiments include a process that automates as many decisions in the migration process as possible. In areas where preparer judgment is necessary, a logical integrated starting point may be provided instead of a disjoint tool or tertiary report to consider.

FIGS. 1-9 describe a workflow that facilitates XBRL taxonomy migration with minimal external support and no editing of XBRL source files by hand or use of another tool. In the embodiments, several different patterns for migration from one XBRL taxonomy to a new XBRL taxonomy may be addressed. The migration patterns are described as follows:

1) Direct Mapping—The XBRL concept in the old taxonomy is mapped directly to an XBRL concept in the new taxonomy with the same name.

2) One-to-One Mapping (Different Concept)—An equivalent XBRL concept in the new taxonomy is mapped to by an XBRL concept in the old taxonomy that is now considered deprecated.

3) One-to-One Mapping (Different Concept or Attribute Change)—Where a new XBRL concept may simply have an attribute change compared to an old XBRL concept, the new XBRL concept in the new taxonomy is mapped to by the old XBRL concept in the old taxonomy that is now considered deprecated.

4) One-to-Many Mapping (Increased Granularity)—Multiple new XBRL concepts of greater specificity exist in the new taxonomy which amount to the now deprecated XBRL concept when summed together.

5) One-to-Many Mapping (Choice)—Two or more different XBRL concepts exist in the new taxonomy that are potentially valid migration paths from the deprecated XBRL concept in the old taxonomy, and the preparer may choose between the new XBRL concepts.

6) Many-to-One Mapping (Dimensionalized)—Multiple XBRL concepts in the old taxonomy are deprecated and consolidated into a new XBRL concept in the new taxonomy, and the new XBRL concept should now be segmented by an axis and a member at the fact usages of the new XBRL concept.

7) Many-to-One Mapping (Encompassing)—Multiple XBRL concepts of greater specificity in the old taxonomy are deprecated and replaced by a new aggregating XBRL concept in the new taxonomy. If fact collisions exist, the facts should be segmented by an axis or new extensions created to support this roll-up.

8) Bridge Mapping—An official taxonomy concept (or one referenced by the official taxonomy) appears to be no longer supported and no migration path is provided to the new XBRL taxonomy. A new extension may be created to bridge this gap in the new taxonomy.

Embodiments of automated migration from an older taxonomy to a newer taxonomy may cover migration on all patterns except for #4 and #5 above, because patterns #4 and #5 may require a user choice between new XBRL concepts. Other patterns may include follow-up actions that are detailed in a report of an embodiment of an XBRL automated taxonomy migration process.

FIG. 1 illustrates a process for XBRL taxonomy migration 100, according to an embodiment. The illustrated process begins at a step 102 by inputting an XBRL report into an XBRL document tagging system that uses an XBRL taxonomy version 1. This should not be construed as limiting, as the taxonomy version may be any number in various embodiments, and "version 1" is used here only for convenience of description. The XBRL report may be a report which is fully tagged with XBRL tags, for example, a 10-Q or 10-K document. The report may be tagged using one or more different taxonomies simultaneously, and only one of the multiple taxonomies may be migrated at a given time while the other taxonomies remain unchanged.

After entering the XBRL report, at a step 104 a user may select a menu option "Menu>Export" to download, at a step 106, the XBRL report from within the system's internal memory and data structures into an XML file called the migration export file 108. After the export is completed, the process 100 reaches a milestone or stopping point 110, at which point the taxonomy migration process 100 may be temporarily stopped so that it may be resumed at a future time as is convenient or desired by the user.

When the user is ready to continue migrating the XBRL document from a "version 1" taxonomy to a different version of the taxonomy, at a step 112 the user may select a menu option "Menu>Import" to select the migration export file 108 at a step 114 and at a step 116 upload the XML migration export file 108 of the XBRL document using the "version 1" taxonomy which was previously downloaded into the system for migrating to a new and different target XBRL taxonomy version, e.g., "version 2".

Note that a source document (e.g., 10-Q or 10-K) may include tags from multiple different XBRL taxonomies simultaneously, but only one of the multiple different XBRL taxonomies may be undergoing migration from one version (e.g., "version 1") to another (e.g., "version 2"). The upload process may gather metadata from within the migration export file that corresponds to a selected taxonomy that is being migrated from "version 1" to "version 2" for efficient processing during migration, such that tags of different taxonomies are not affected by the migration.

Once the upload of the migration export file has been completed, an automated migration subprocess 118 may begin. The automated migration subprocess 118 may call a migration services process 120 to perform part or all of the substantive automated migration steps. The migration services process 120 may be performed on a same computer system (e.g., local computer system) as the overall taxonomy migration process 100, or the migration services process 120 may be performed remotely by another computer system (e.g., remote computer system), for example, by a compute server located elsewhere and communicatively coupled with the local computer system over a computing network, e.g., a WiFi network, an Ethernet network, or the Internet. The migration services process 120 may be a Software as a Service (SaaS) product offered to the user in "the cloud" for cloud computing. The automated migration process 120 may perform migrations which do not require additional user input or decisions, but may be completely automated. For example, the automated migration process may perform migration patterns 1-4 as discussed above.

The automated migration process 118 may output, at a step 122, a migration report 124 that includes descriptions of the changes made when migrating the XBRL document from "version 1" to "version 2" of the taxonomy. The migration report 124 may be a data file following a comma separated value (CSV) format, or may be displayed on a graphical user interface (GUI) for the user to review. The report 124 may include information about each migration such as severity, message, migration pattern, type, official notes, original concept, migrated concept, and notes from the taxonomy migration process 100. At the conclusion of the automated migration process 118, the taxonomy migration process 100 may reach another milestone 126. The automated migration process 118 is discussed in greater detail with respect to FIG. 2. An undo step 128 may return the taxonomy migration process 100 to milestone 110.

For taxonomy migration paths which cannot be fully automated and require some additional user input, iterations of assisted migration processes may be performed. By selecting a menu item "Menu>Review Extensions" at a step 130, a user may review taxonomy customizations or extensions that could not be automatically migrated in the automated migration process 118. Remaining extensions which are not automatically migrated in the automated migration process 118 may be identified and tagged with metadata called "NavKeys" at a step 132 herein for identification and processing. In a user interface, a notification panel may include a list of extensions that have yet to be migrated, and the items on the list may be checked off as the user iterates (via a step 134) over the process 130 associated with "Menu>Review Extensions" and migrates the items from "version 1" to "version 2." Following the last iteration over step 132, the taxonomy migration process 100 may reach a milestone 142.

For each extension in the list, the user may replace the extension with a new XBRL concept as needed at a step 136 to migrate from the "version 1" taxonomy to the "version 2" taxonomy. The user may perform a new concept search at a step 138 in the "version 2" taxonomy, and at a step 140 may perform a "smart" concept replacement of the extension of the "version 1" taxonomy with a concept in "version 2". If the extension of "version 1" matches a new concept in the "version 2" taxonomy, the extension may be automatically mapped to and replaced by the new concept.

Figure 9:
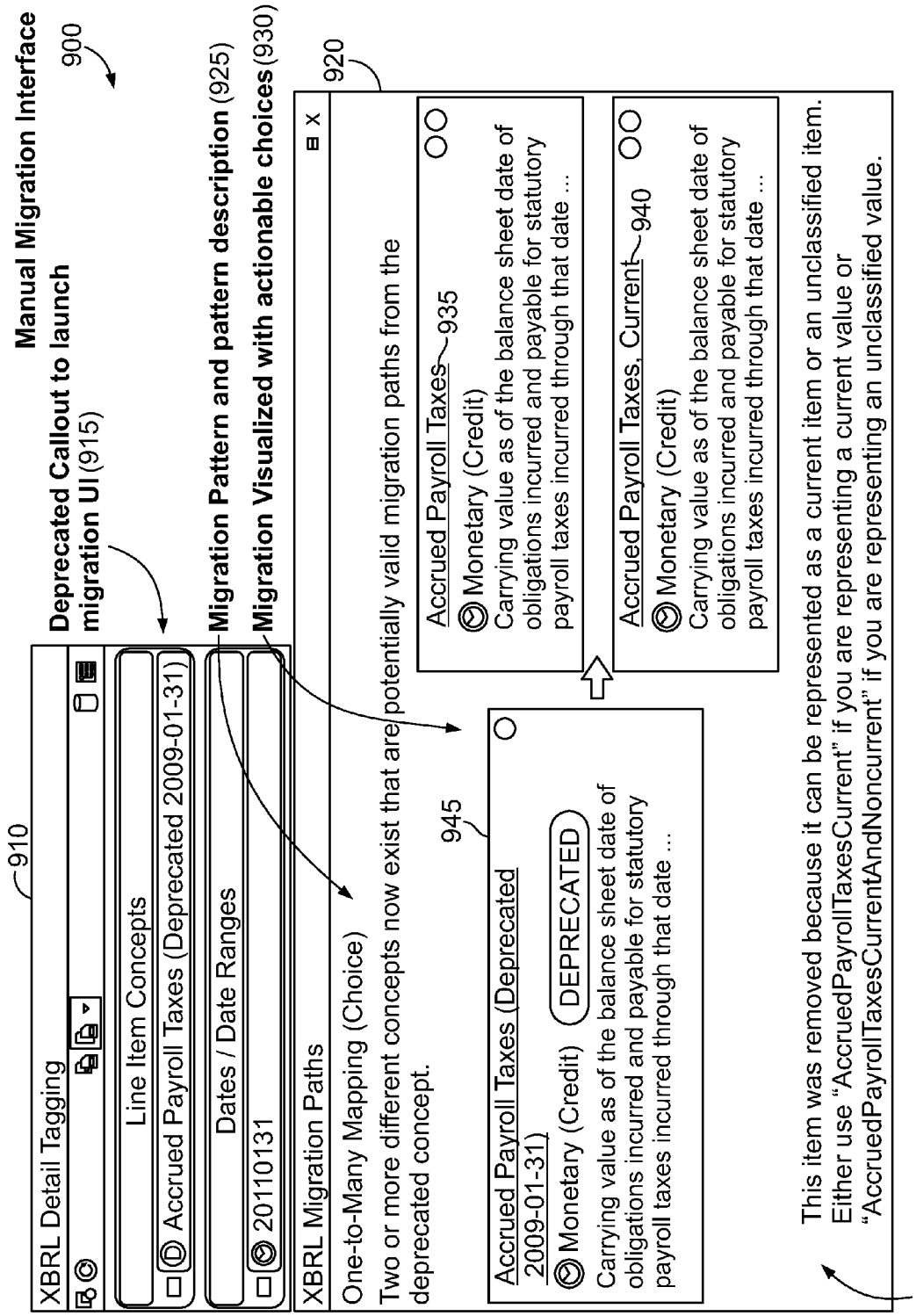
FIG. 9 illustrates a computer software user interface for manual XBRL migration, according to an embodiment.

A user may find deprecated concepts in the "version 1" taxonomy that need user-input to be migrated to the "version 2" taxonomy by selecting a menu item "Menu>Find Deprecated" at a step 144. For example, a deprecated concept from the "version 1" taxonomy may have a one-to-many mapping migration pattern that requires the user to choose among several different concepts in the "version 2" taxonomy. The process to find deprecated concepts 144 may be performed by the user in a similar manner as the process to review extensions 130 described above, except that the user may perform a visual migration choice process 146 rather than a search new concept process 138. The visual migration choice process 146 is illustrated in FIG. 9.

The process to find deprecated concepts 144 may be iterated (via a step 148) until a number of entries in a list of deprecated concepts in a notification panel of the user interface dwindles down to zero entries. For each deprecated concept in the list, the user may replace the extension with a new XBRL concept as needed at a step 152 to migrate from the "version 1" taxonomy to the "version 2" taxonomy. Remaining deprecated concepts may be identified and tagged with NavKeys at a step 150 herein for identification and processing. Upon completion of the iteration (via step 148) over the process to find deprecated concepts 144 and process to identify and tag remaining deprecated concepts with NavKeys 150, the taxonomy migration process 100 may be complete.

Figure 2:
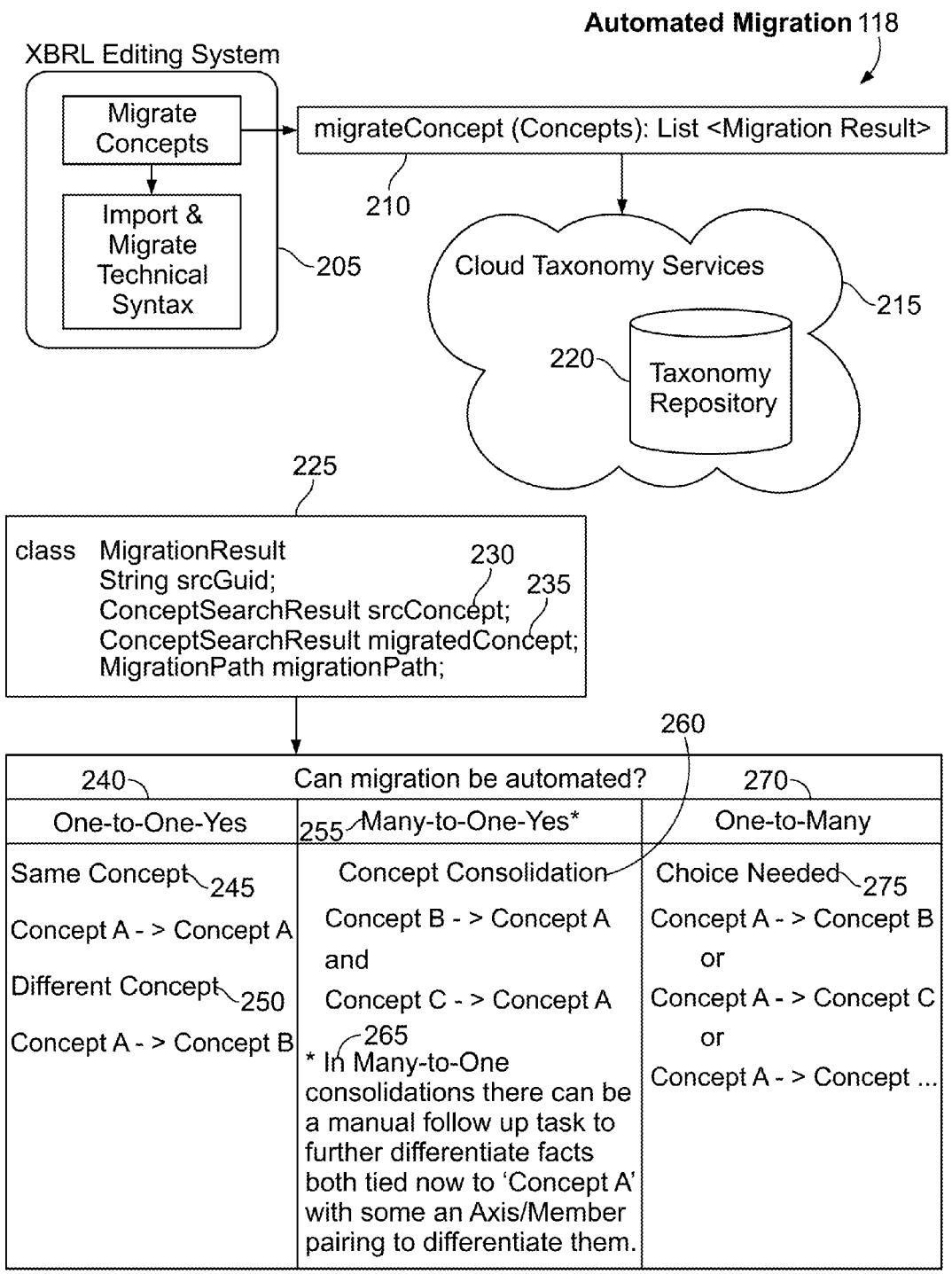
FIG. 2 illustrates the automated migration subprocess of FIG. 1 in more detail, according to an embodiment.

FIG. 2 illustrates the automated migration subprocess 118 of FIG. 1 in more detail, according to an embodiment. Within the XBRL editing system 205 performing the taxonomy migration process 100, a callout may be made using the call "migrateConcepts(concepts):List<MigrationResult>" 210 to a migration services process such as a cloud taxonomy services process 215. The cloud taxonomy services process 215 may include a repository of taxonomies 220. The cloud taxonomy services process 215 outputs a result including a list of concepts for migration which may be represented in the form of a class 225. Whether a migration from a source concept 230 (e.g., "version 1" concept) to a migrated concept 235 (e.g., "version 2" concept) may be determined according to the migration pattern, as discussed above. For example, in a one-to-one mapping 240, the concepts may be automatically migrated, either to a same concept 245 or to a different concept 250. As another example, in a many-to-one mapping 255, whether the migration can be automated may be dependent upon whether fact collisions occur. In the many-to-one migration pattern of concept consolidation 260, both concept B and concept C in the "version 1" taxonomy may be mapped to concept A in the "version 2" taxonomy. There may be a manual follow-up user task 265 to further differentiate facts that are both tied to concept A in the "version 2" taxonomy but that were tied to different concepts in the "version 1" taxonomy. The differentiation may include some axis and member pairing of the fact usages. As a third example, in a one-to-many mapping 270, the user may manually choose, in a choice pattern 275, to which of several different concepts in the "version 2" taxonomy the concept in the "version 1" taxonomy should be mapped.

Figure 3:
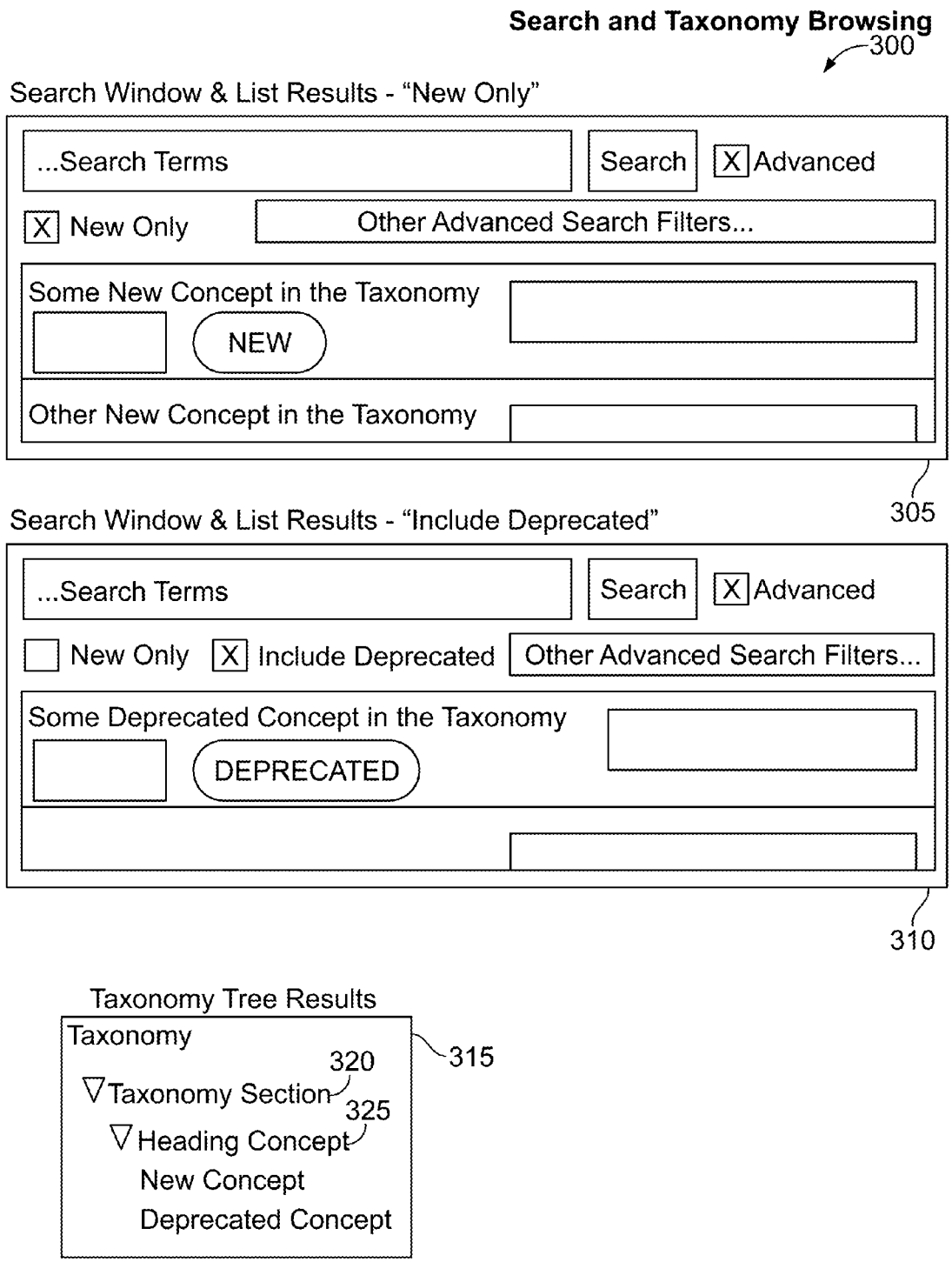
FIG. 3 illustrates a computer software user interface for XBRL search and taxonomy browsing, according to an embodiment.

FIG. 3 illustrates a computer software user interface 300 for XBRL search and taxonomy browsing, according to an embodiment. The user interface 300 for XBRL search and taxonomy browsing may be used during the review extensions process 130 of FIG. 1. In a search window 305, the user may choose to search for only new concepts in the "version 2" taxonomy as illustrated at the top of FIG. 3. Alternatively, in the search window 310, the user may choose to search for deprecated concepts in the "version 2" taxonomy as illustrated in the middle of FIG. 3. In addition, the user may choose to search for both new and deprecated concepts in the "version 2" taxonomy. The search results may be provided to the user as a taxonomy tree 315, for example as illustrated in the bottom of FIG. 3. The taxonomy tree 315 may have different sections 320, each of which include different concepts 325. Each of the listed concepts may indicate whether the concept is new or deprecated.

FIG. 4 illustrates a window of a computer software user interface 400 for new XBRL concept search, according to an embodiment. The new XBRL concept search interface 400 of FIG. 4 may be an embodiment of performing the new concept search 305 at the top of FIG. 3. The bottom of the window 405 may include a scrollable window pane 410 showing results from the search indicating whether the concepts are new (415).

FIG. 5 illustrates a window of a computer software user interface 500 for deprecated XBRL concept search, according to an embodiment. The deprecated XBRL concept search interface 500 of FIG. 5 may be an embodiment of performing the deprecated concept search 310 at the middle of FIG. 3. The bottom of the window 505 may include a scrollable window pane 510 showing results from the search indicating whether the concepts are deprecated (515). The deprecated concept search may include deprecated concepts as well as other concepts that meet the search term. In the example illustrated in FIG. 5, the search term 520 is "cash", and all concepts that match "cash", including deprecated concepts, are shown in the results listing 525.

Figure 6:
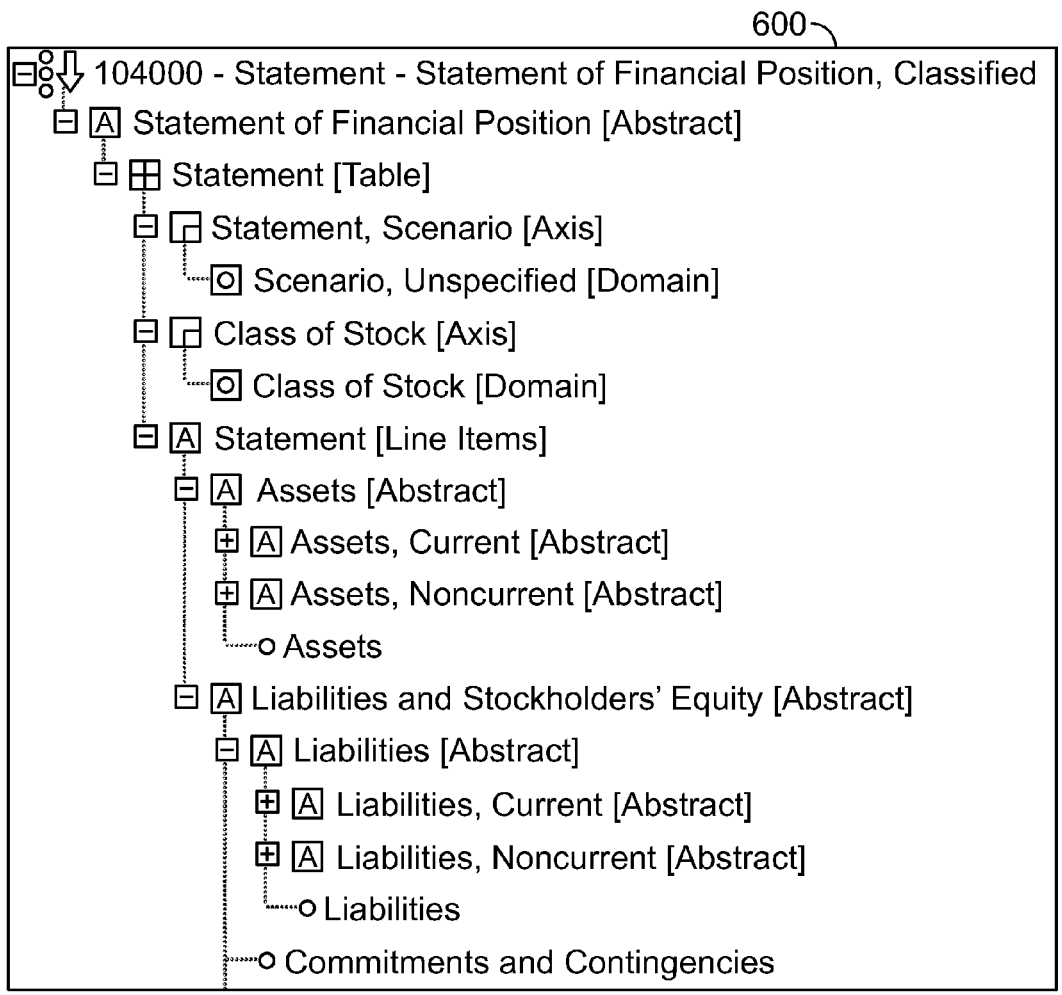
FIG. 6 illustrates a window of a computer software user interface for a new XBRL concept callout in a taxonomy tree, according to an embodiment.

FIG. 6 illustrates a window 600 of a computer software user interface for a new XBRL concept callout in a taxonomy tree, according to an embodiment. The window 600 may show the search results in a taxonomy tree if the search window 405 of FIG. 4 has the button "taxonomy tree" 420 selected. The taxonomy tree may highlight the new taxonomy concepts or show the new taxonomy concepts with a different color, in a different typeface, or adjacent to a unique symbol, for example.

Figure 7:
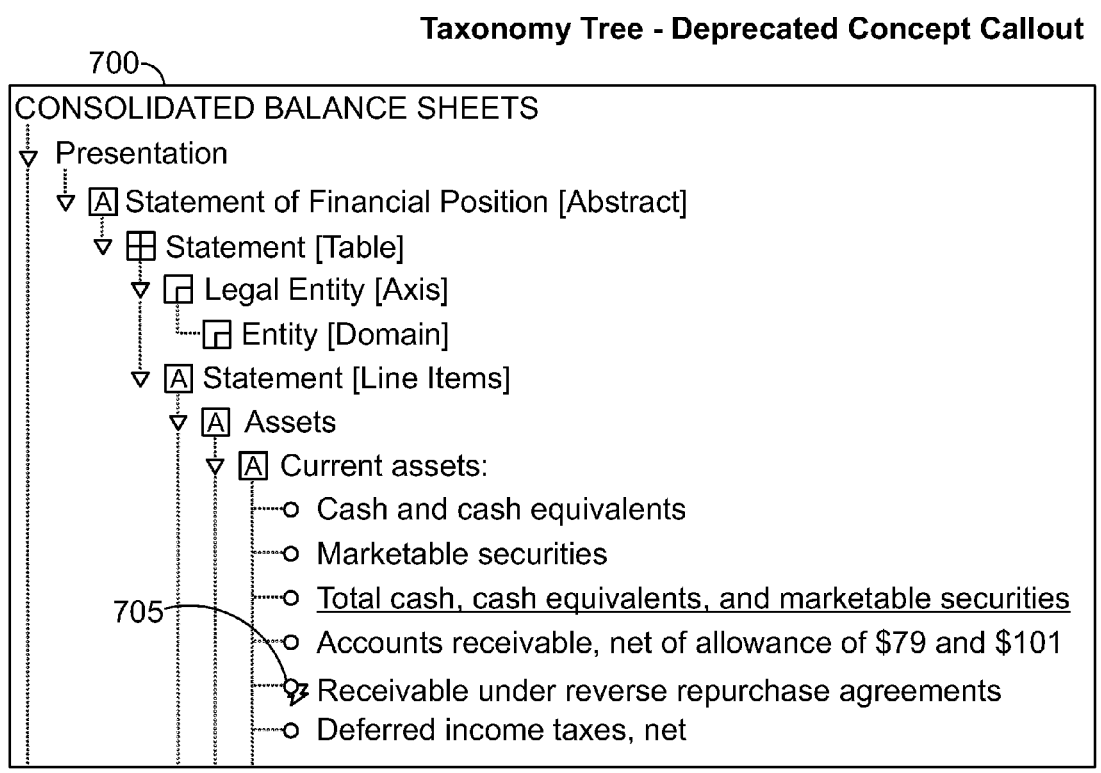
FIG. 7 illustrates a window of a computer software user interface for a deprecated XBRL concept callout in a taxonomy tree, according to an embodiment.

FIG. 7 illustrates a window 700 of a computer software user interface for a deprecated XBRL concept callout in a taxonomy tree, according to an embodiment. The window 700 may show the search results in a taxonomy tree if the search window 505 of FIG. 5 has the button "taxonomy tree" 530 selected. The taxonomy tree may highlight the deprecated taxonomy concepts 705 or show the deprecated taxonomy concepts 705 with a different color, in a different typeface, or adjacent to a unique symbol, for example.

Figure 8:
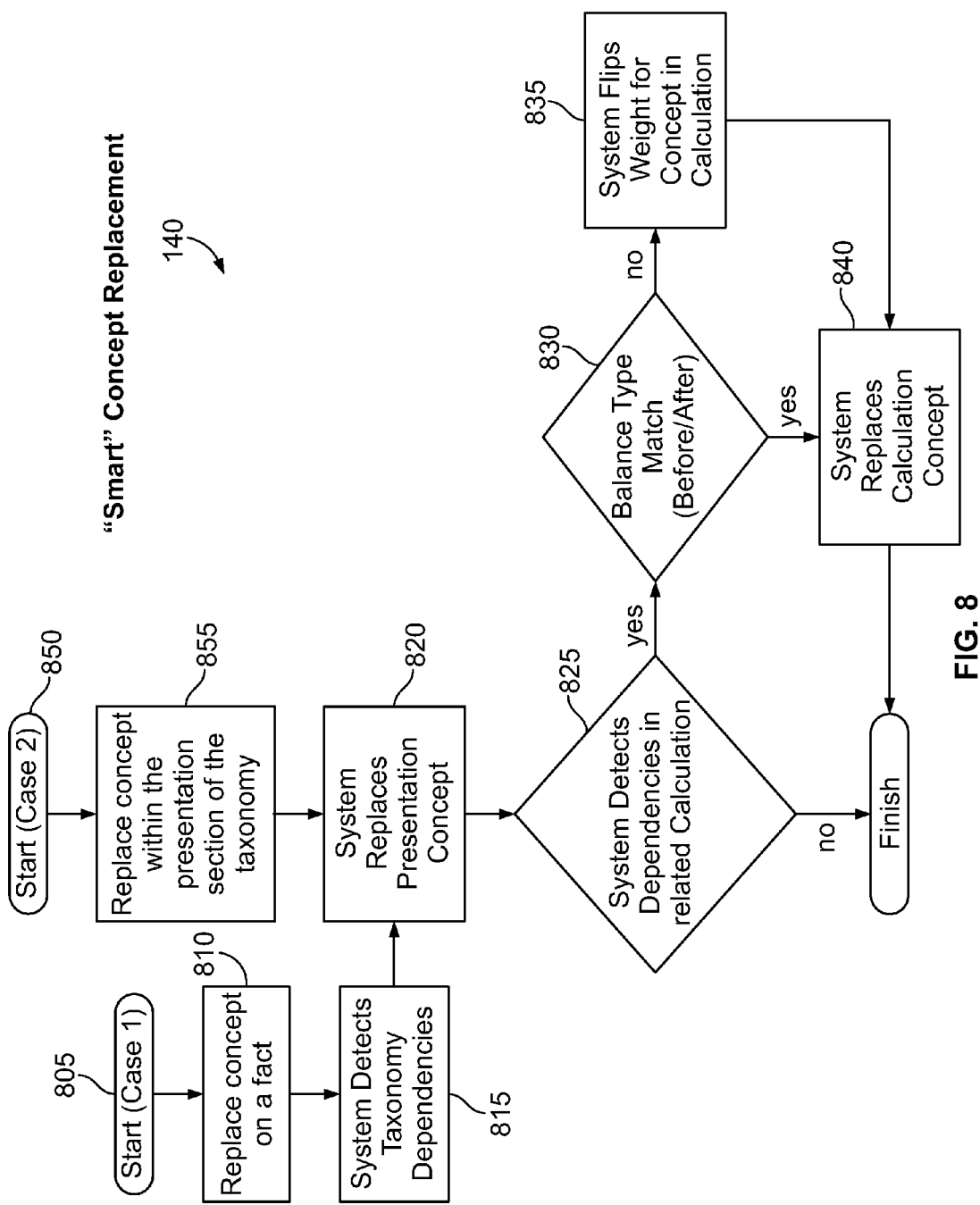
FIG. 8 illustrates the "smart" automated XBRL concept replacement subprocess of FIG. 1 in more detail, according to an embodiment.

FIG. 8 illustrates the "smart" automated XBRL concept replacement subprocess 140 illustrated in FIG. 1 in more detail, according to an embodiment. A goal of the "smart" automated XBRL concept replacement is to ensure that calculations performed before the concept replacement still produce the correct (or same) results after the concept replacement. The "smart" concept replacement process may be a convenient feature for a user to ensure that when concepts are replaced while migrating from a "version 1" taxonomy to a "version 2" taxonomy, adjustments are automatically made throughout the taxonomy and/or XBRL document to maintain the overall accuracy of the data represented by the XBRL document.

The process of FIG. 8 may begin starting from one of two different scenarios. In a first case 805, a concept on a fact may be replaced at a step 810. In other words, the migration of the concept may be performed from the perspective of the tagged value in the XBRL document. In this case, the system may detect taxonomy dependencies within the XBRL document at a step 815 and replace the presentation concept accordingly at a step 820. Then, the system may detect dependencies in calculations related to the replaced concept at a step 825. For example, a calculation (e.g., a+b+c=total) may compute a formula that uses the replaced concept. If the system does detect a dependency, a balance type of the concept (e.g., debit or credit) of the original "version 1" taxonomy concept and the replacement "version 2" taxonomy concept are compared to one another at a step 830. For example, if the original concept is a debit and the replacement concept is a credit, then the balance type of the concepts do not match and the weight of the replacement concept is flipped from being an addition of a concept to the total to a subtraction of the concept from the total at a step 835. This is done in order to maintain the integrity of the calculations using the replacement concept when the original concept is replaced with the replacement concept at a step 840. If the original and replacement concepts are both debits or both credits, then the concepts may be considered to match and there is no flipping performed when the original concept is replaced by the replacement concept at the step 840.

For example, in the calculation assertion a+b+c=total, there are four facts in the XBRL instance document corresponding to each of the concepts a, b, c, and total. An XBRL processor would sum the facts corresponding to a+b+c and compare the computed sum with the fourth fact corresponding to total in this example. An arc (an XML element) having a weight attribute (which may be either 1 or −1) represents a relationship between each of the facts of a, b, and c and the fact of total. When the weight attribute of the arc is 1, the contributor is added to arrive at the total, and when the weight is −1, the contributor is subtracted to arrive at the total. In the calculation assertion a+b+c=total where b is a concept with a debit balance type, the concept b may be replaced with a concept d where d is a concept with a credit balance type. After the replacement of concept b with concept d, the calculation assertion would be updated to be represented as a-d+c=total in order to maintain consistency. Thus, the weight of the arc corresponding to the replacement concept d in the calculation assertion a-d+c=total is adjusted or flipped in comparison with the arc corresponding to the replaced concept b in the calculation assertion a+b+c=total. As illustrated herein, in an embodiment, the "smart" concept replacement automates the adjustment of the weight of the arcs to maintain consistency without requiring manual editing of calculation assertions by the user.

In a second case 850, a concept within the presentation section of the taxonomy may be replaced at a step 855. The second case is performed similarly as the first case, except that a detection of taxonomy dependencies may not be performed prior to the system replacing the presentation concept at the step 820.

FIG. 9 illustrates a computer software user interface 900 for manual XBRL migration, according to an embodiment. A user may also manually migrate individual XBRL callouts from a "version 1" taxonomy to a "version 2" taxonomy. For example, a user may utilize an XBRL tagging interface to view concepts in an XBRL document. If the user sees that a concept is deprecated (915) as illustrated in the top left of FIG. 9, the user may start a manual taxonomy migration process using a manual migration interface 920 as shown in the lower right of FIG. 9. The system may present a number of relevant migration patterns (925) based on the deprecated concept (e.g., one-to-many mapping) to the user and may visualize the relevant migration patterns for the user (930). The migration patterns may be presented along with descriptions thereof. The interface window 920 may show a plurality of options from which the user may choose in performing the migration. For example, in the one-to-many mapping, the user may be able to select between "Accrued Payroll Taxes" (935) or "Accrued Payroll Taxes, Current" (940) when migrating the deprecated concept "Accrued Payroll Taxes (Deprecated 2009-01-31)" (945). The interface window may also show some official notes (950) from the taxonomy about the deprecated concept to help the user decide to which new concept to migrate the deprecated concept. The interface notes 950 may, for example, explain why the user may want to choose one new concept over another new concept.

Figure 10:
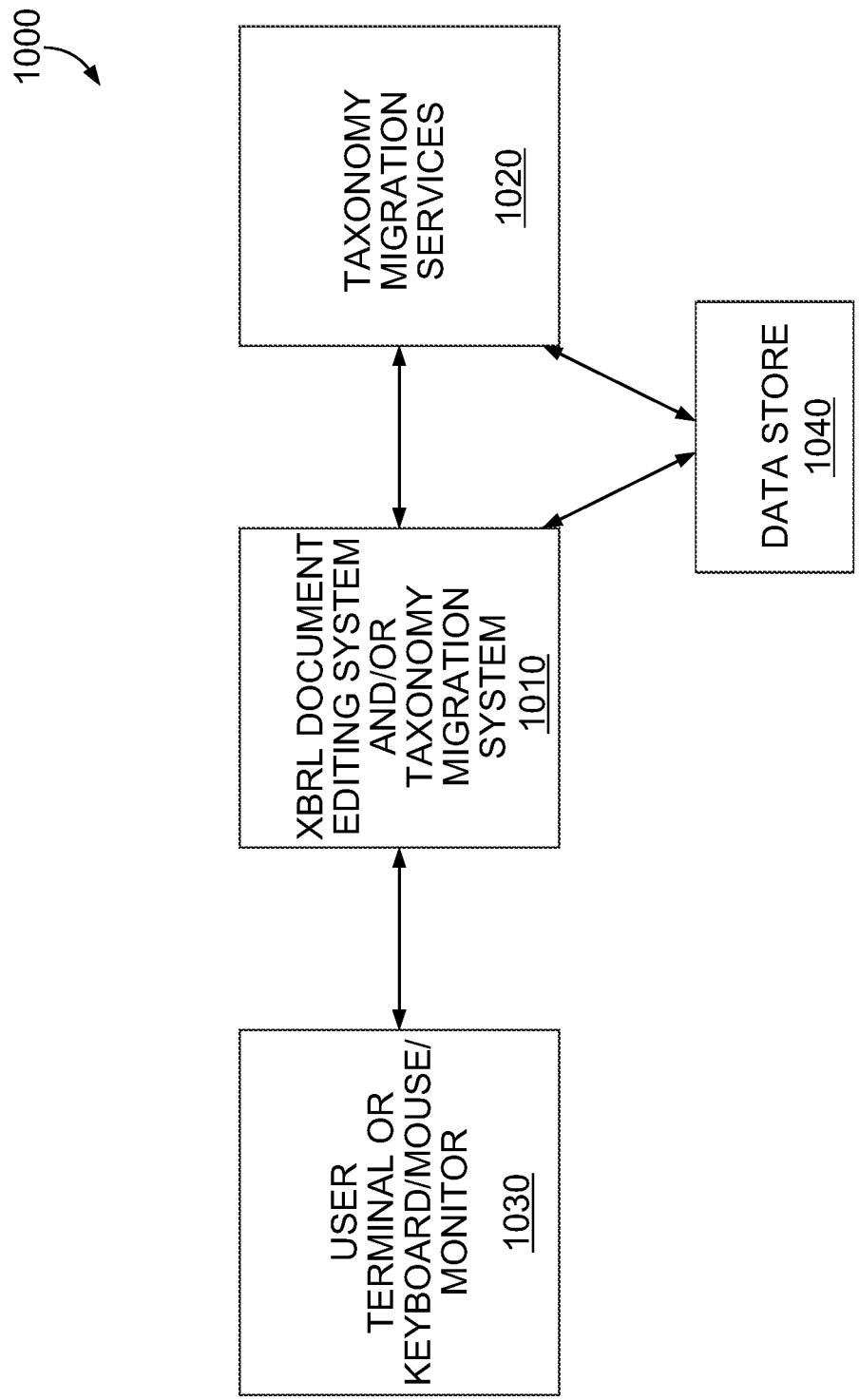
FIG. 10 illustrates an example architecture including the XBRL taxonomy migration system and a taxonomy migration services process in the cloud, according to an embodiment.

FIG. 10 illustrates an example architecture 1000 including the XBRL document editing system and/or taxonomy migration system 1010 and a taxonomy migration services process 1020 in the cloud, according to an embodiment. The XBRL document editing system and/or taxonomy migration system 1010 may connect to a user terminal or keyboard/mouse/monitor 1030. In various embodiments, a user may use the XBRL document editing system and/or taxonomy migration system 1010 on a local computer, or on a remote computer over a network. Likewise, in various embodiments, the taxonomy migration services process 1020 may operate on a computer local to the user, local to the XBRL document editing system and/or taxonomy migration system 1010, or remote from both over a network. In various embodiments, one or both of the XBRL document editing system and/or taxonomy migration system 1010 or the taxonomy migration services process 1020 may be implemented using client-server architectures or as SaaS products. Both the XBRL document editing system and/or taxonomy migration system 1010 and the taxonomy migration services process 1020 may connect to a data store 1040.

Figure 11:
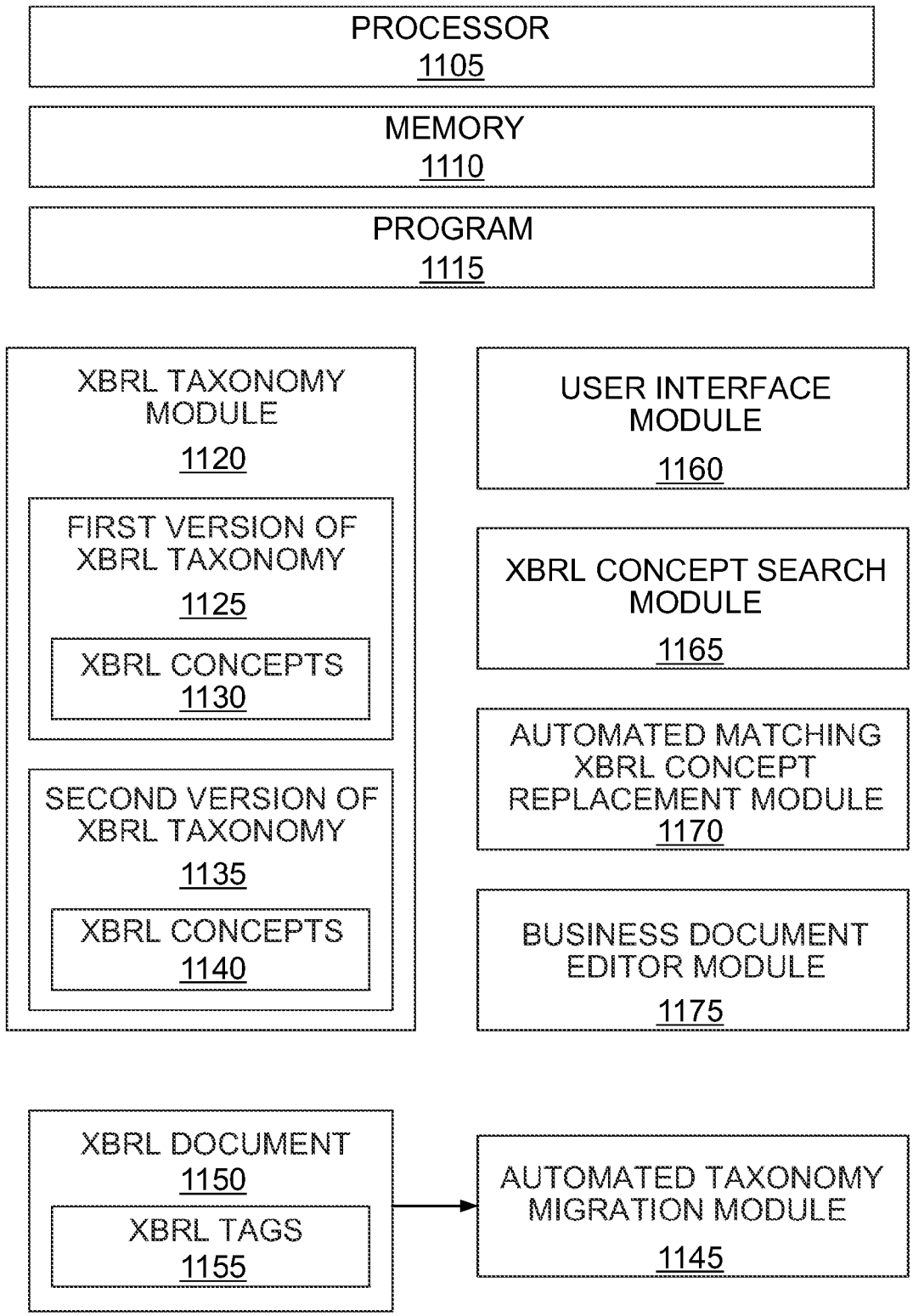
FIG. 11 illustrates an XBRL taxonomy migration system, according to an embodiment.

FIG. 11 illustrates an XBRL taxonomy migration system 1100, according to an embodiment. The XBRL taxonomy migration system 1100 includes a processor 1105 having a memory 1110 on which a program 1115 executable by the processor is stored for performing a method of XBRL taxonomy migration.

The XBRL taxonomy migration system 1100 also includes an XBRL taxonomy module 1120 including a first version of an XBRL taxonomy 1125 having XBRL concepts 1130 and a second version of the XBRL taxonomy 1135 having related XBRL concepts 1140.

The XBRL taxonomy migration system 1100 additionally includes an automated taxonomy migration module 1145 that facilitates migrating XBRL concepts 1130 of an XBRL document 1150 having XBRL tags 1155 by replacing XBRL concepts 1130 of the first version of the XBRL taxonomy with XBRL concepts 1140 of the second version of the XBRL taxonomy.

The XBRL taxonomy migration system 1100 may further include a user interface module 1160 that identifies and facilitates migrating specific XBRL taxonomy concepts within an XBRL document from the first to the second version of the XBRL taxonomy.

The XBRL taxonomy migration system 1100 may further include an XBRL concept search module 1165 that searches for XBRL concepts matching search conditions within at least one of the XBRL document 1150 and the first and second versions 1125 and 1135 of the XBRL taxonomy, respectively.

The XBRL taxonomy migration system may further include an automated matching XBRL concept replacement module 1170 that detects dependencies in calculations in the XBRL document 1150 using the migrating XBRL concepts 1130. When dependencies are detected, the XBRL taxonomy migration system 1100 may determine whether a balance type of a first version XBRL taxonomy concept 1130 matches a balance type of a second version XBRL taxonomy concept 1140 replacing the first version XBRL taxonomy concept 1130 in the XBRL document 1150. When the balance type of the first version XBRL taxonomy concept 1130 does not match the balance type of the second version XBRL taxonomy concept 1140, the XBRL taxonomy migration system 1100 may adjust a weight of an arc using the XBRL taxonomy concept 1140 in a calculation assertion when replacing the first version XBRL taxonomy concept 1130 with the second version XBRL taxonomy concept 1140 in the XBRL document 1150.

The XBRL taxonomy migration system 1100 may further include a business document editor module 1175 that facilitates tagging of business document entries with XBRL tags 1155 using the XBRL taxonomy module 1120.

The Appendix presents a relevant portion of the 2011 Official US GAAP Release Notes that describe exemplary relationships between the deprecated 2009 Official US GAAP XBRL taxonomy and the 2011 Official US GAAP XBRL taxonomy. The Appendix illustrates exemplary relationships between deprecated concepts and replacement concepts in a new version of an XBRL taxonomy.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. For example, the principles discussed herein may also applicable to other markup-language-based documents besides XBRL as known to one of ordinary skill in the art. In the description of the embodiments, certain detailed explanations of related art are omitted when it is deemed that they may unnecessarily obscure the essence of the invention.

The system described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

APPENDIX

| 2011 Official US GAAP Release Notes | |
| --- | --- |
| Deprecated Relationship | Description |
| No Relationship (Appendix 3, Part A) | No replacement elements exist. Such deprecated items (299 from the 2009 Taxonomy) are included in a Deprecated Concepts Group in the Presentation Linkbase (only) with no on-going relationship to supported elements. |
| essence-alias | The essence-alias relationship is a one to one relationship in which a deprecated element has been replaced by an identical concept. Any elements that fell under this relationship also fall under the dep-concept-deprecatedConcept relationship. All deprecated elements with an essence-alias relationship are included in the count of the dep-concept-deprecatedConcept relationship. |
| dep-aggregateConcept-deprecatedPartConcept (Appendix 3, Part B) | The dep-aggregateConcept-deprecatedPartConcept relationship in the Definition Hierarchy (linkbase) represents multiple concepts that have been deprecated in favor of a single, higher level, more encompassing concept. Sixty nine (69) elements have been deprecated from the 2009 Taxonomy and assigned this relationship. For instance, if three previously distinct groups of elements such as class of common stock, preferred stock, and convertible preferred stock were combined into a single Dimensional Table, the element that combines and replaces the three elements would be an aggregate concept replacing the three part concepts. |
| dep-concept-deprecatedConcept (Appendix 3, part C) | The dep-concept-deprecatedConcept relationship in the Definition Hierarchy (linkbase) represents a one to one relationship. Two hundred and three (203) elements have been deprecated from the 2009 Taxonomy and assigned this relationship. For instance, if an "Instant" period type element replaces a "Duration" period type element, then this relationship would be categorized by the dep-concept-deprecatedConcept relationship. |
| dep-dimensionallyQualifiedConcept-deprecatedConcept (Appendix 3, Part D) | In the case where an element was replaced with a dimensional equivalent, (e.g., Common Stock, Additional Series, No Par Value) the deprecated and replacement element is described using the dep-dimensioallyQualifiedConcept-deprecatedConcept relationship. The fact that was previously meant to be represented by the deprecated element has been replaced by the interaction between the "new" Line Item and the dimensionally qualifying Table Member. One hundred and thirty (130) elements have been deprecated from the 2009 Taxonomy and assigned this relationship. |
| dep-mutuallyExclusiveConcept-deprecatedConcept (Appendix 3, part E) | The dep-mutuallyExclusiveConcept-deprecatedConcept relationship is used when the deprecated element can be represented as two concepts. Two (2) elements have been deprecated from the 2009 Taxonomy and described using this relationship. For instance, the 2009 Taxonomy included elements that were meant to represent either the current portion of a concept in a classified balance sheet or the aggregate of the current and noncurrent portion in an unclassified presentation. Such concepts are mutually exclusive for financial data tagging purposes and, therefore, such elements have been deprecated and replaced with separate |

APPENDIX-continued

2011 Official US GAAP Release Notes

| Deprecated Relationship | Description |
| --- | --- |
| | mutually exclusive concepts. Preparers that previously used such deprecated concepts should only use one of the mutually exclusive replacement concepts; the value previously tagged with the deprecated concept should not be apportioned between the new concepts. |
| dep-partConcept-deprecatedAggregateConcept (Appendix 3, Part F) | The dep-partConcept-deprecatedAggregateConcept relationship was assigned to deprecated items that were replaced by elements representing greater detail. For instance, if "borrowings concepts" was deprecated and replaced with specific concepts representing distinct types of borrowings and the concepts thereof, the dep-partConcept-deprecatedAggregateConcept relationship was assigned. Thirty seven (37) elements have been deprecated from the 2009 Taxonomy and assigned this relationship. |
| Undeprecated (Appendix 3, Part G) | There were seven (7) elements that were undeprecated from the 2009 Taxonomy for various reasons. The definition relationships defining these elements as deprecated were removed and these elements were placed into the presentation and calculation roles within the taxonomy as appropriate. |

What is claimed is:

1. An XBRL taxonomy migration system comprising:
a processor having a memory that stores a program executable by the processor for performing a method of XBRL taxonomy migration;
an XBRL taxonomy module including a first version of a first XBRL taxonomy having XBRL concepts and a second version of the first XBRL taxonomy having related XBRL concepts, each of the first version of the first XBRL taxonomy and the second version of the first XBRL taxonomy including a base taxonomy and optionally one or more extensions of the base taxonomy; and
an automated taxonomy migration module that receives an XBRL document having XBRL tags of the first version of the first XBRL taxonomy and migrates the received XBRL document to the second version of the first XBRL taxonomy by replacing XBRL concepts of the first version of the first XBRL taxonomy in the received XBRL document with XBRL concepts of the second version of the first XBRL taxonomy, wherein the migrated XBRL document no longer uses the first version of the first XBRL taxonomy,
wherein the automated taxonomy migration module maintains tags from the received XBRL document that are of a second XBRL taxonomy in the migrated XBRL document, the second XBRL taxonomy being different from the first XBRL taxonomy and tags of the second XBRL taxonomy being simultaneously included with the XBRL tags of the first XBRL taxonomy in the received XBRL document.

2. The XBRL taxonomy migration system of claim 1, further comprising a user interface module that identifies and facilitates replacing the XBRL concepts of the first version of the first XBRL taxonomy within the received XBRL document with the XBRL concepts of the second version of the first XBRL taxonomy.

3. The XBRL taxonomy migration system of claim 1, further comprising an XBRL concept search module that searches for XBRL concepts matching search conditions within at least one searched entity selected from the group consisting of the received XBRL document and the first and second versions of the first XBRL taxonomy.

4. The XBRL taxonomy migration system of claim 1, further comprising an automated matching XBRL concept replacement module that:
detects dependencies in calculations in the received XBRL document using the XBRL concepts in the received XBRL document;
when dependencies are detected, determines whether a balance type of the first version XBRL taxonomy concept matches a balance type of a related second version XBRL taxonomy concept;
when the balance type of the first version XBRL taxonomy concept matches the balance type of the related second version XBRL taxonomy concept, replaces the first version XBRL taxonomy concept in the received XBRL document with the related second version XBRL taxonomy concept of the matched balance type; and
when the balance type of the first version XBRL taxonomy concept does not match the balance type of the related second version XBRL taxonomy concept, adjusts a weight of an arc using the related second version XBRL taxonomy concept in a calculation assertion when replacing the first version XBRL taxonomy concept in the received XBRL document with the related second version XBRL taxonomy concept.

5. The XBRL taxonomy migration system of claim 4, wherein the automated matching XBRL concept replacement module also detects taxonomy dependencies within the received XBRL document and replaces the first version XBRL taxonomy concept in the received XBRL document with the related second version XBRL taxonomy concept according to the detected taxonomy dependencies.

6. The XBRL taxonomy migration system of claim 1, further comprising a business document editor module that facilitates tagging of business document entries with XBRL tags using the XBRL taxonomy module.

7. The XBRL taxonomy migration system of claim 1, wherein the automated taxonomy migration module gathers metadata that corresponds to the first version of the first XBRL taxonomy during migration of the received XBRL document to the second version of the first XBRL taxonomy.

8. The XBRL taxonomy migration system of claim 1, wherein the automated taxonomy migration module automatically replaces the XBRL concepts of the first version of the first XBRL taxonomy in the received XBRL document with the XBRL concepts of the second version of the first XBRL taxonomy without a user manually selecting the XBRL concepts of the second version of the first XBRL taxonomy.

9. A method of performing XBRL taxonomy migration comprising:
   receiving an XBRL document having XBRL tags of a first version of a first XBRL taxonomy;
   migrating, by a processor, the received XBRL document to a second version of the first XBRL taxonomy by replacing XBRL concepts of the first version of the first XBRL taxonomy in the received XBRL document with XBRL concepts of the second version of the first XBRL taxonomy such that the migrated XBRL document no longer uses the first version of the first XBRL taxonomy, each of the first version of the first XBRL taxonomy and the second version of the first XBRL taxonomy including a base taxonomy and optionally one or more extensions of the base taxonomy,
   wherein the migrating includes maintaining tags from the received XBRL document that are of a second XBRL taxonomy in the migrated XBRL document, the second XBRL taxonomy being different from the first XBRL taxonomy and tags of the second XBRL taxonomy being simultaneously included with the XBRL tags of the first XBRL taxonomy in the received XBRL document.

10. The method of claim 9, further comprising searching for XBRL concepts matching search conditions within at least one searched entity selected from the group consisting of the received XBRL document and the first and second versions of the first XBRL taxonomy.

11. The method of claim 7, wherein the search conditions comprise searching for a new XBRL concept in the second version of the first XBRL taxonomy.

12. The method of claim 10, wherein the search conditions comprise searching for a deprecated XBRL concept in the second version of the first XBRL taxonomy.

13. The method of claim 10, wherein the search results are presented to a user in a taxonomy tree.

14. The method of claim 9, further comprising:
   detecting dependencies in calculations in the received XBRL document using the XBRL concepts in the received XBRL document;
   when dependencies are detected, determining whether a balance type of the first version XBRL taxonomy concept matches a balance type of a related second version XBRL taxonomy concept;
   when the balance type of the first version XBRL taxonomy concept matches the balance type of the related second version XBRL taxonomy concept, replacing the first version XBRL taxonomy concept in the received XBRL document with the related second version XBRL taxonomy concept of the matched balance type; and
   when the balance type of the first version XBRL taxonomy concept does not match the balance type of the related second version XBRL taxonomy concept,
   adjusting a weight of an arc using the related second version XBRL taxonomy concept in a calculation assertion when replacing the first version XBRL taxonomy concept in the received XBRL document with the related second version XBRL taxonomy concept.

15. The method of claim 14, further comprising detecting taxonomy dependencies within the received XBRL document and wherein replacing the first version XBRL taxonomy concept in the received XBRL document with the related second version XBRL taxonomy concept is according to the detected taxonomy dependencies.

16. The method of claim 9, wherein the migrating comprises gathering metadata that corresponds to the first version of the first XBRL taxonomy.

17. The method of claim 9, wherein the migrating comprises automatically replacing the XBRL concepts of the first version of the first XBRL taxonomy in the received XBRL document with the XBRL concepts of the second version of the first XBRL taxonomy without a user manually selecting the XBRL concepts of the second version of the first XBRL taxonomy.

18. The method of claim 9, wherein the migrating comprises a direct mapping in which an XBRL concept of the first version of the first XBRL taxonomy having a name is mapped to an XBRL concept of the second version of the first XBRL taxonomy having the same name.

19. The method of claim 9, wherein the migrating comprises a one-to-one mapping in which a deprecated XBRL concept of the first version of the first XBRL taxonomy is mapped to an equivalent XBRL concept of the second version of the first XBRL taxonomy having a different name.

20. The method of claim 9, wherein the migrating comprises a one-to-one mapping in which a deprecated XBRL concept of the first version of the first XBRL taxonomy having a name is mapped to an XBRL concept of the second version of the first XBRL taxonomy having the same name and a changed attribute compared to the deprecated XBRL concept.

21. The method of claim 9, wherein the migrating comprises a one-to-many mapping in which a deprecated XBRL concept of the first version of the first XBRL taxonomy is mapped to a selected one of a plurality of XBRL concepts of the second version of the first XBRL taxonomy having greater specificity compared to the deprecated XBRL concept.

22. The method of claim 9, wherein the migrating comprises a one-to-many mapping in which a deprecated XBRL concept of the first version of the first XBRL taxonomy is mapped to a selected one of a plurality of XBRL concepts of the second version of the first XBRL taxonomy, each of the plurality of XBRL concepts of the second version of the first XBRL taxonomy being a valid migration path from the deprecated XBRL concept.

23. The method of claim 9, wherein the migrating comprises a many-to-one mapping in which a plurality of deprecated XBRL concepts of the first version of the first XBRL taxonomy are mapped to a single XBRL concept of the second version of the first XBRL taxonomy, and the single XBRL concept of the second version is segmented by an axis and a member at fact usages of the single XBRL concept of the second version.

24. The method of claim 9, wherein the migrating comprises a many-to-one mapping in which a plurality of deprecated XBRL concepts of the first version of the first XBRL taxonomy are mapped to a single XBRL concept of the second version of the first XBRL taxonomy, the single XBRL concept of the second version aggregating the plurality of deprecated XBRL concepts of the first version which have greater specificity than the single XBRL concept of the second version.

25. The method of claim 24, wherein the facts that collide are segmented by an axis or a new XBRL extension.

26. The method of claim 9, wherein the migrating comprises a bridge mapping in which a deprecated XBRL concept of the first version of the first XBRL taxonomy is not mapped to any XBRL concept of the second version of the first XBRL taxonomy, and a new XBRL extension is created to provide a new XBRL concept to replace the deprecated XBRL concept.

* * * * *